(12) United States Patent
Mao et al.

(10) Patent No.: US 6,374,032 B1
(45) Date of Patent: Apr. 16, 2002

(54) VARIABLE OPTICAL ATTENUATOR

(75) Inventors: Hongwei Mao; Jian Chen; Brian Liu, all of San Jose, CA (US)

(73) Assignee: JDS Uniphase Corporation, San Jose, CA (US)

(*) Notice: Subject to any disclaimer, the term of this patent is extended or adjusted under 35 U.S.C. 154(b) by 0 days.

(21) Appl. No.: 09/299,553

(22) Filed: Apr. 22, 1999

(51) Int. Cl.$^7$ .................................................. G02B 6/00
(52) U.S. Cl. ..................... 385/140; 385/25; 359/236
(58) Field of Search .......................... 385/140, 37, 31, 385/24, 25; 359/235, 227, 234, 236

(56) References Cited

U.S. PATENT DOCUMENTS

| | | | |
|---|---|---|---|
| 2,619,538 A | * 11/1952 | Grant ........................ 333/81 B |
| 4,516,827 A | 5/1985 | Lance et al. .................. 350/96 |
| 4,591,231 A | 5/1986 | Kaiser et al. ................. 350/96 |
| 4,989,938 A | 2/1991 | Tamulevich ................. 350/96 |
| 5,087,122 A | 2/1992 | Ostrander et al. ............. 356/73 |
| 5,325,459 A | 6/1994 | Schmidt ..................... 385/140 |
| 5,677,977 A | 10/1997 | Smith ........................ 385/140 |
| 5,745,634 A | 4/1998 | Garrett et al. ............... 385/140 |
| 5,805,759 A | * 9/1998 | Fukushima .................. 385/140 |
| 5,900,983 A | * 5/1999 | Ford et al. .................. 385/140 |
| 6,149,278 A | * 11/2000 | Mao et al. ................... 359/862 |
| 6,167,185 A | * 12/2000 | Smiley et al. ............... 385/140 |
| 6,240,237 B1 | * 5/2001 | Lelu ........................... 385/140 |

* cited by examiner

*Primary Examiner*—Cassandra Spyrou
*Assistant Examiner*—Euncha Cherry
(74) *Attorney, Agent, or Firm*—Randy Lacasse; Kevin E. Green; Lacasse & Associates

(57) ABSTRACT

A variable optical attenuator is described. A special profile blocker is rotated across a large angel (e.g., 180° to 360°) to provide a variable amount of attenuation. In one embodiment, the special profile blocker is an eccentrically driven wheel. The special profile blocker is driven by a stepper motor via a gear assembly. In one embodiment, the variable optical attenuator includes a beam splitter for the input and/or the output signal for monitoring of signal strength and/or feedback control of the attenuator.

13 Claims, 5 Drawing Sheets

VARIABLE OPTICAL ATTENUATOR

FIELD OF THE INVENTION

The invention relates to optical communications. More particularly, the invention relates to a variable attenuator for optical communications.

BACKGROUND OF THE INVENTION

Optical attenuators are used to optimize the optical power of signals at key points in optical communications networks. For example, in networks having Erbium Doped Fiber Amplifiers (EDFAs), optical attenuators are used between stages of EDFAs to provide constant gain. In Wavelength Division Multiplexed (WDM) systems, optical attenuators are used to adjust optical power of "added" laser signals to match the signal strength of other channels within the network. Optical attenuators can also be used to set signal strength within the range of a particular receiver.

In order to optimize signal strength in fiber optic networks, fiber optic attenuators have been developed. For example, U.S. Pat. No. 5,087,122 issued to Ostrander, et al. (the '122 patent) discloses a blocking beam type attenuator. The '122 patent discloses a vane-line mechanical blocker that is gradually rotated in to a collimated beam to cause light attenuation. The attenuator of the '122 patent provides low insertion loss, low polarization dependent loss, and low wavelength dependent loss.

However, compact size is desired for most fiber optic components. The attenuator of the '122 patent is not compact in size. Further, the attenuator of the '122 patent provides a full range of attenuation over a small angle of rotation. Thus, the attenuator of the '122 patent requires precise control, which increases manufacturing costs. What is needed is an improved attenuator for use with fiber optic communications signals.

SUMMARY OF THE INVENTION

A variable fiber optic attenuator is described. The attenuator includes an input port to receive an optical signal. The attenuator can also include an output port that receives an attenuated version of the input signal and causes the attenuated signal to focus on an output device (e.g., an optical fiber). A special profile blocker is used to attenuate the optical signal resulting in an attenuated optical signal. In one embodiment, the special profile blocker is an eccentrically driven wheel. In an alternative embodiment, the special profile blocker is a cam with a radius that gradually changes angularly.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

An optical attenuator is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A variable optical attenuator is described. A special profile blocker is rotated across a large angle (e.g., 180° to 360°) to provide a variable amount of attenuation. In one embodiment, the special profile blocker is an eccentrically driven wheel. The special profile blocker is driven by a stepper motor via a gear assembly. In one embodiment, the variable optical attenuator includes a beam splitter for the input and/or the output signal for monitoring of signal strength and/or feedback control of the attenuator.

Figure 1:
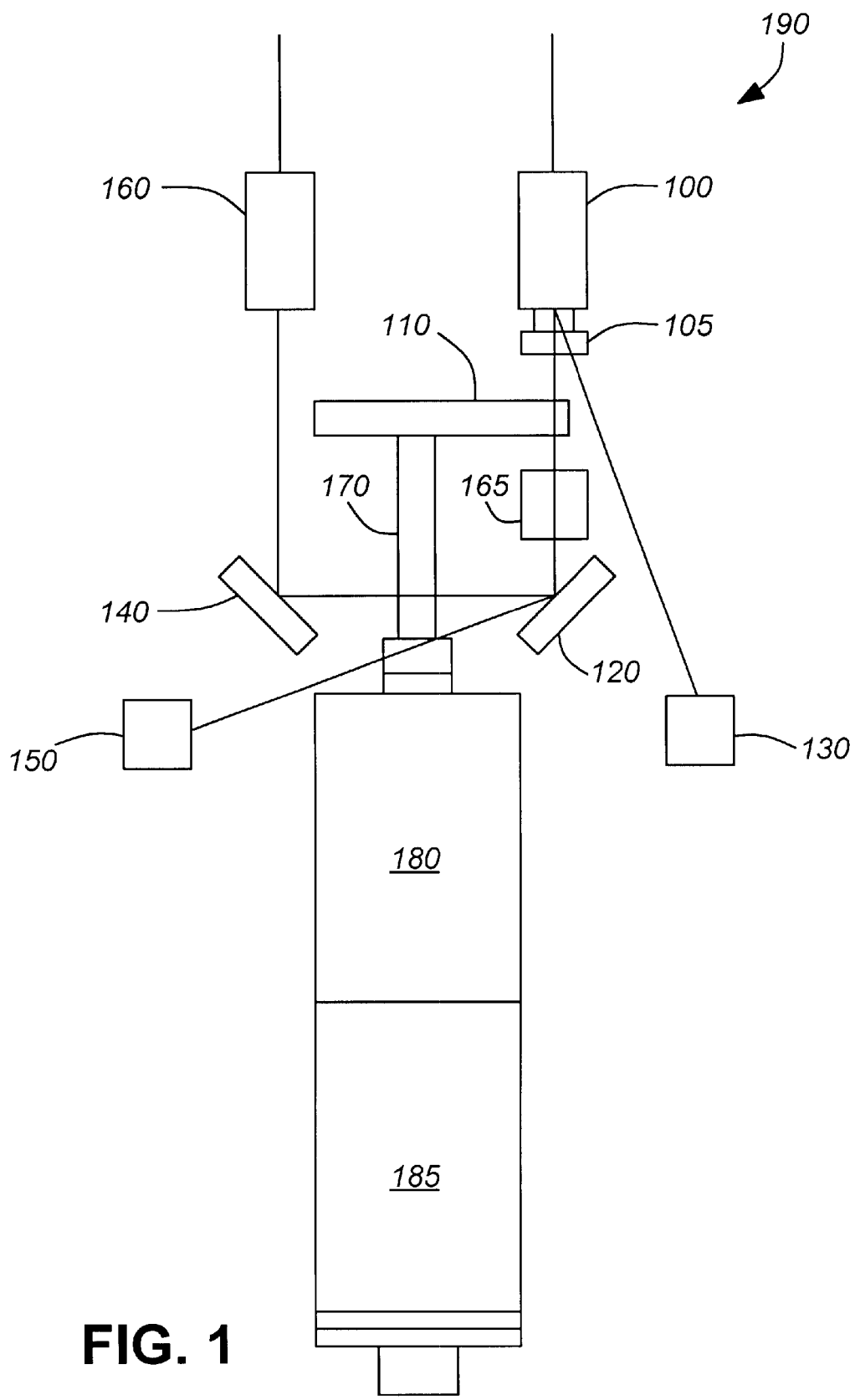
FIG. 1 is a top view of an optical attenuator according to one embodiment of the invention.

FIG. 1 is a top view of an optical attenuator according to one embodiment of the invention. The optical attenuator of FIG. 1 is described as using an eccentrically driven wheel; however, other special profile light blocking devices can also be used. The eccentrically driven wheel allows attenuation over a very large angle (e.g. 180°). By tuning attenuation over a large angle, high resolution tuning can be provided using an ordinary stepping motor rather than a high precision motor or other high precision device.

Collimator 100 provides an input port to attenuator 190. Pre-collimated light can be received by attenuator 190, in which case, input collimator 100 is not required to be part of attenuator 190. Light from input collimator 100 is split by beam splitter 105 to direct a small percentage (e.g., 3% to 5%) to intensity monitor 130. Any percentage of the input signal can be directed to intensity monitor 130. In one embodiment beam splitter 105 is a holographic beam splitter; however, other beam splitting devices can also be used. In one embodiment, intensity monitor 130 provides an output signal indicating the strength of the input signal. In an alternative embodiment that is described in greater detail below, intensity monitor 130 provides feedback for control of attenuator 190.

Special profile blocker 110 blocks all or a portion of the remaining portion (e.g., 95% to 97%) of the input signal from collimator 100 based on the rotation angle of the special profile blocker. In one embodiment special profile blocker 110 is angularly rotated into the optical signal between input collimator 100 and mirror 120. As described in greater detail below, the angle of rotation of special profile blocker 110 determines the attenuation of the input signal.

In one embodiment stepper motor 185 drives gear assembly 180 to rotate shaft 170 that is connected to special profile blocker 110. In one embodiment, special profile blocker 110 is an eccentrically driven wheel manufactured of stainless steel or some other appropriate material. Shaft 170 is connected to the wheel at a point that is offset from the center of the wheel. If special profile blocker 110 is not a wheel shape, special profile blocker 110 may be driven in a non-eccentric manner.

The attenuated signal is directed to beam splitter 165. In one embodiment, beam splitter 165 is a holographic beam splitter that directs a small percentage (e.g., 3% to 5%) of the attenuated signal received to intensity monitor 150 via mirror 120. Other types of beam splitters and other percentages can also be used. The remaining portion of the attenuated signal (e.g., 95% to 97%) is reflected by mirror 120 to mirror 140.

The signal reflected by mirror 120 is an attenuated version of the input signal received by input collimator 100. Mirror 140 reflects the attenuated signal to output collimator 160. In one embodiment mirrors 120 and 140 are 45° mirrors that change the direction of the attenuated signal by 90°. Other configurations with a different number of mirrors can also be used.

In operation, special profile blocker 110 is rotated by stepper motor 185. In one embodiment special profile blocker 110 is an eccentrically driven wheel, one configuration of which is described in greater detail below. Other special profile blockers include, but are not limited to an ellipse, a parabola, etc. As special profile blocker 110 is rotated by stepper motor 185, the radius of special profile blocker 110 changes to gradually attenuate the intensity of the input beam.

In one embodiment when the portion with the shortest radius is aligned with the input beam, the beam completely passes special profile blocker 110. When the portion with the largest radius is aligned with the input beam, the beam is completely blocked. Other radii can also be used. In one embodiment, the portion with the shortest radius is diametrically opposed to the portion with the largest radius. Thus, attenuation of the input beam is accomplished by 180° on an eccentrically driven wheel. Because the angular rotation for attenuation is large, the precision of the components of attenuator 190 is greatly reduced as compared to other attenuator configurations, for example, vane-type attenuators.

Figure 2:
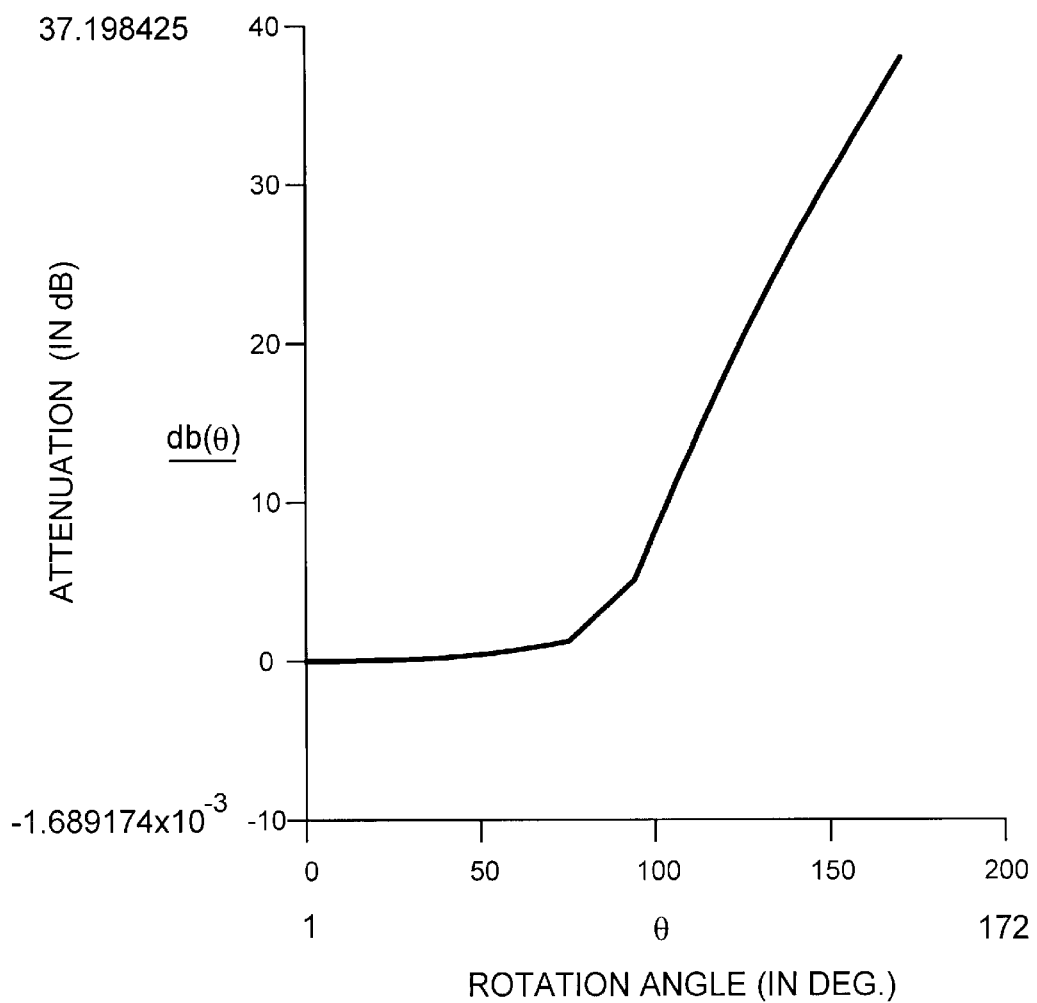
FIG. 2 is a tuning curve for an attenuator having an eccentrically driven wheel according to one embodiment of the invention.

FIG. 2 is a tuning curve for an attenuator having an eccentrically driven wheel according to one embodiment of the invention. The tuning according to the curve of FIG. 2 provides attenuation from 0 dB at 0° rotation of the special profile blocker and attenuation of approximately 37.2 dB at 172° rotation of the special profile blocker. Other tuning curves can be used for other special profile blockers if desired.

Figure 3:
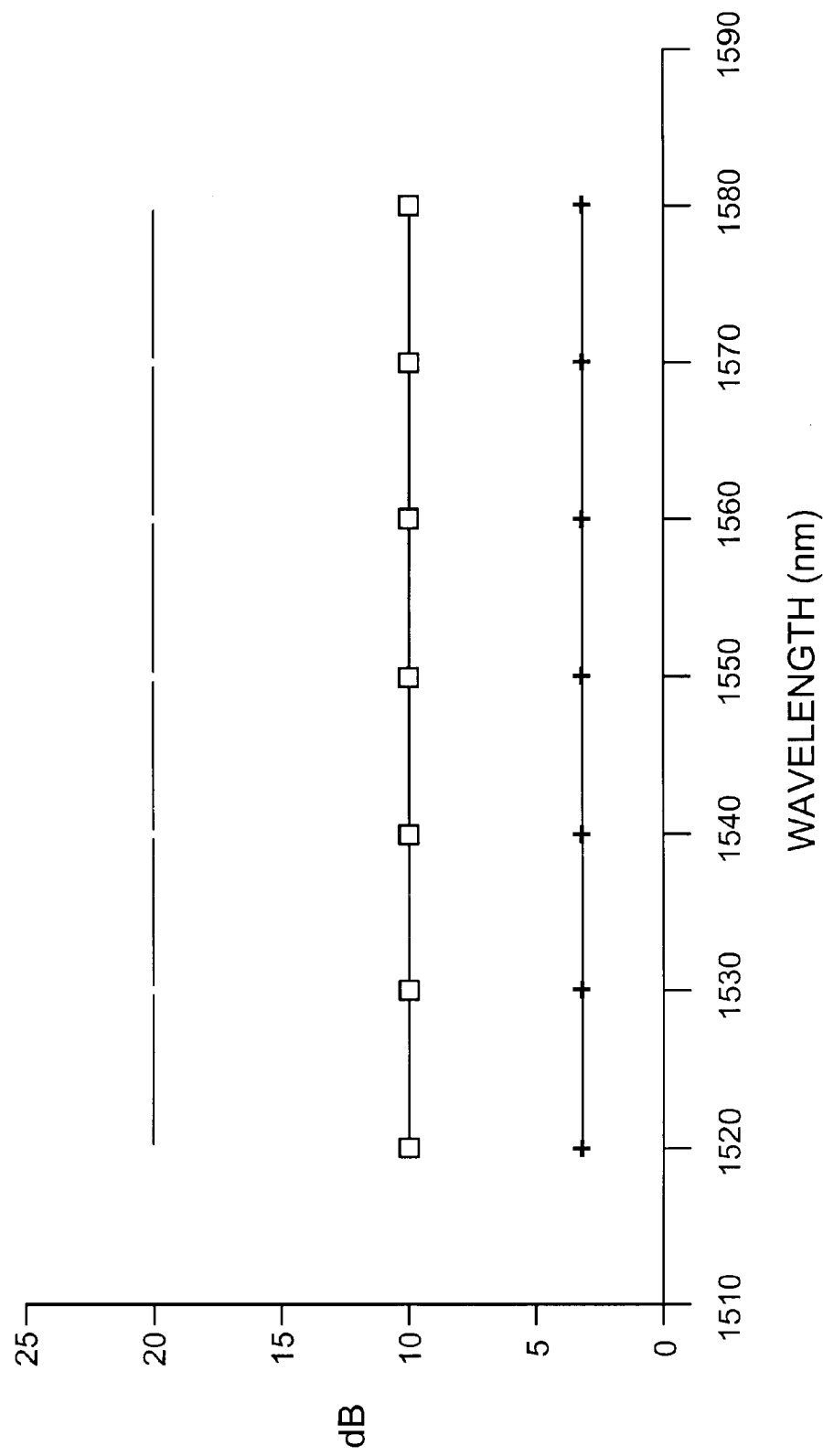
FIG. 3 is a set of wavelength dependent loss curves for an attenuator having the tuning curve of FIG. 2.

FIG. 3 is a set of wavelength dependent loss curves for an attenuator having the tuning curve of FIG. 2. The curves of FIG. 3 correspond to wavelength dependent attenuation at 20 dB, 10 dB, and minimum insertion positions.

Figure 4:
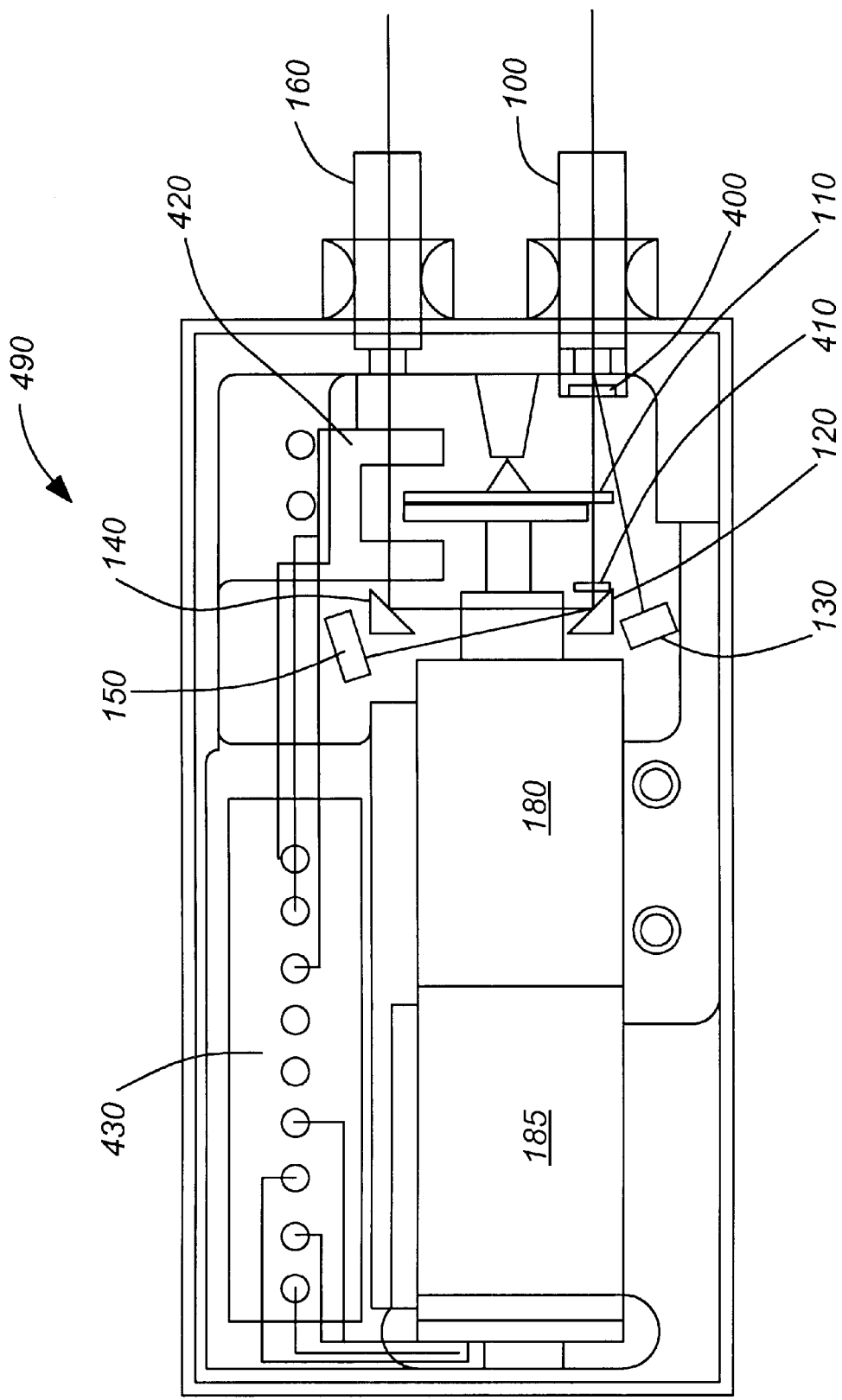
FIG. 4 is a side view of an optical attenuator according to one embodiment of the invention.

FIG. 4 is a side view of an optical attenuator according to one embodiment of the invention. Attentuator 490 includes stepper motor 185 and gear assembly 180 to drive special profile blocker 110 as described above with respect to FIG. 1. Attenuator 490 includes position and attenuation monitoring components that can also be used to provide feedback to control special profile blocker 110.

Input port 100 is optically coupled to beam splitter 400. In one embodiment, beam splitter 400 is a holographic beam splitter; however, other beam splitting devices can also be used. One sub-beam from beam splitter 400 is directed to intensity monitor 130. In one embodiment the sub-beam directed to intensity monitor 130 is 3% to 5% of the beam received at input port 100; however, other proportions can also be directed to intensity monitor 130. Intensity monitor 130 provides an indication of the intensity of the input signal.

The second sub-beam from beam splitter 400 (95% to 97% of the input signal) is directed to beam splitter 410. The signal received by beam splitter 410 is an attenuated version of the input signal to attenuator 490. In one embodiment beam splitter 410 is a holographic beam splitter; however, other types of beam splitters can also be used. Beam splitter 410 also directs two sub-beams to mirror 120. One sub-beam is directed to intensity monitor 150. In one embodiment the sub-beam directed to intensity monitor 150 represents 3% to 5% of the beam received by beam splitter 410. In alternative embodiments, other proportions can be used. Intensity monitor 150 provides an indication of the intensity of the attenuated signal. The other sub-beam (95% to 97% of the attenuated signal) is directed to mirror 140, which directs the beam to output port 160.

Attenuator 420 also includes position monitor 420. In one embodiment, position monitor 420 includes a light emitting diode (LED) and corresponding detector that can be used to determine the position of special profile blocker 110. Special profile blocker 100 includes a protrusion that blocks the LED when special profile blocker 110 is in a predetermined position. Positioning relative to the predetermined position is determined based on the motion of stepper motor 185. Other types of position monitors can also be used.

Control circuit 430 is coupled to position monitor 420 and to stepper motor 185 to determine the position of special profile blocker 110. In an alternative embodiment (not shown in FIG. 4) intensity monitor 150 is coupled to control circuit 430 to provide feedback about the intensity of the output signal of attenuator 490. Control circuit 430 can then control stepper motor 185 to modify the position of special profile blocker 110 as necessary. Intensity monitor 130 can also be coupled to control circuit 430 to provide feedback. Intensity monitors 130 and 150 can also be used to calibrate attenuator 490.

Figure 5:
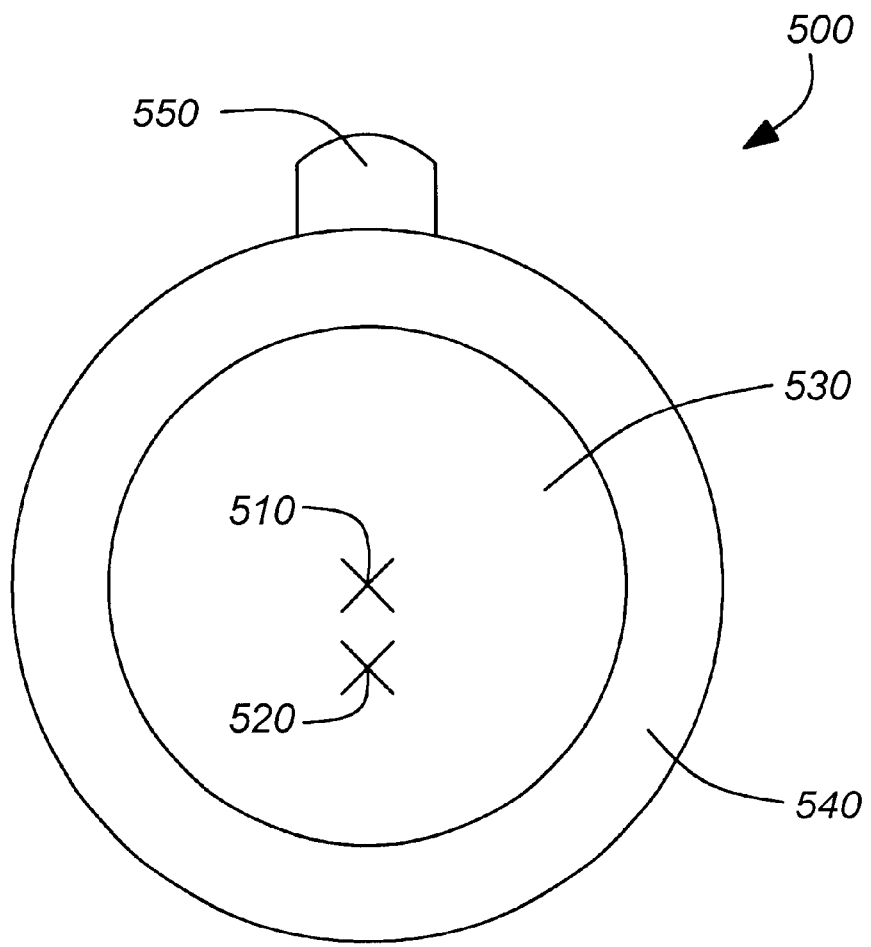
FIG. 5 illustrates one embodiment of an eccentrically driven wheel suitable for use with the invention.

FIG. 5 illustrates one embodiment of an eccentrically driven wheel suitable for use with the invention. In one embodiment, wheel 500 includes protrusion 550 for position monitoring as described above with respect to FIG. 4. In one embodiment protrusion 550 is 0.9 mm high and 3.2 mm wide; however, other dimensions can also be used. In an alternative embodiment, wheel 500 does not include protrusion 550 and position is tracked in another manner.

A shaft (not shown in FIG. 5) driving wheel 500 is connected to wheel 500 at 520, which is offset from the center of wheel 500 as indicated by 510. In one embodiment, the offset is 0.45 mm; however, other offsets can also be used. The offset of the shaft connection from the center of wheel 500 provides an eccentrically driven wheel that varies attenuation of a signal in response to angular rotation of wheel 500.

In one embodiment wheel 500 comprises inner portion 530 that is generally perpendicular to the shaft driving wheel 500. Wheel 500 also comprises outer portion 540 that is angled with respect to inner portion 530. Thus, the outer edge of wheel 500 is not square with respect to the front and back surfaces. In one embodiment, inner portion 530 has a diameter of 8.0 mm and outer portion 540 has a diameter of 8.9 mm. Other dimensions can also be used.

In alternative embodiments wheel 500 is replaced with a special profile blocker of another shape. For example, a cam with a radius that is gradually changed angularly can be used.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An attenuator for attenuating an optical beam, comprising a rotary, optically opaque eccentric or eccentrically rotatable blocker defining a center of rotation and having a radial perimeter of a gradually changing radius relative to the center of rotation, the rotary blocker disposed to rotate in a plane transverse to the optical beam such that the radial perimeter of the blocker gradually moves into or out of path of the optical beam to block or unblock the beam correspondingly.

2. The attenuator of claim 1 further comprising a stepper motor coupled to the blocker, the stepper motor to rotate the blocker.

3. The attenuator of claim further comprising a stepper motor to control the blocker.

4. The attenuator of claim 1 wherein the blocker comprises an eccentrically driven wheel.

5. The attenuator of claim 4 wherein the eccentrically driven wheel comprises a stainless steel wheel connected to a shaft driven by a stepper motor.

6. The attenuator of claim 5 wherein the shaft is connected to the eccentrically driven wheel approximately 0.45 mm from a center of the wheel.

7. The attenuator of claim 4 wherein the blocker comprises a protrusion to determine a position of the eccentrically driven wheel.

8. The attenuator of claim 1 wherein the blocker comprises a cam having a radius that is gradually changed angularly.

9. The apparatus of claim 1 further comprising first means for monitoring an intensity of the optical beam.

10. The apparatus of claim 1 further comprising second means for monitoring an intensity of an attenuated optical signal.

11. A method for attenuating an optical signal, the method comprising: positioning a rotary optically opaque, eccentric of eccentrically rotatable blocker having a radial perimeter of a gradually changing radius or rotation relative to the center of rotation, adjacent to an optical beam carrying the optical signal, and rotating the opaque blocker in a plane transverse to the optical beam to cause the perimeter of the blocker to gradually move into or out of path of the beam to block or unblock the beam correspondingly.

12. The method of claim 11 wherein the blocker comprises an eccentrically driven wheel.

13. The method of claim 11 wherein the blocker comprises a cam having a radius that is gradually changed angularly.

* * * * *

UNITED STATES PATENT AND TRADEMARK OFFICE
CERTIFICATE OF CORRECTION

PATENT NO.      : 6,374,032 B1
DATED           : April 16, 2002
INVENTOR(S)     : Mao et al.

It is certified that error appears in the above-identified patent and that said Letters Patent is hereby corrected as shown below:

<u>Column 5,</u>
Line 16, "of claim further comprising" should read -- of claim 1 further comprising --

Signed and Sealed this

Twenty-fourth Day of December, 2002

JAMES E. ROGAN
*Director of the United States Patent and Trademark Office*